US007889789B2

(12) United States Patent
Xia et al.

(10) Patent No.: US 7,889,789 B2
(45) Date of Patent: Feb. 15, 2011

(54) MAKING INTERLACE FRAME LEVEL CODING MODE DECISIONS

(75) Inventors: Minghui Xia, Bellevue, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1337 days.

(21) Appl. No.: 11/400,751

(22) Filed: Apr. 7, 2006

(65) Prior Publication Data
US 2007/0237238 A1    Oct. 11, 2007

(51) Int. Cl.
*H04N 7/12* (2006.01)
(52) U.S. Cl. .............................. 375/240.01; 375/240.12
(58) Field of Classification Search .................. 375/240, 375/240.01, 240.12
See application file for complete search history.

(56) References Cited

U.S. PATENT DOCUMENTS

| 5,963,673 | A | 10/1999 | Kodama et al. | |
|---|---|---|---|---|
| 5,991,447 | A | 11/1999 | Eifrig et al. | |
| 6,049,567 | A | 4/2000 | Han | |
| 6,188,725 | B1 | 2/2001 | Sugiyama | |
| 6,192,081 | B1 | 2/2001 | Chiang et al. | |
| 6,263,024 | B1 | 7/2001 | Matsumoto | |
| 6,452,972 | B1 * | 9/2002 | Ohara | 375/240.12 |
| 6,493,385 | B1 | 12/2002 | Sekiguchi et al. | |
| 6,975,680 | B2 | 12/2005 | Demos | |
| 2003/0099292 | A1 | 5/2003 | Wang et al. | |
| 2005/0100093 | A1 | 5/2005 | Holcomb | |

2006/0013307 A1    1/2006    Olivier et al.

FOREIGN PATENT DOCUMENTS

WO    WO2005004491    1/2005

OTHER PUBLICATIONS

Chen et al., "Optimizing INTRA/INTER Coding Mode Decisions," *Proc. Int'l Symp. on Multimedia Info. Processing*, pp. 561-568 (Dec. 1997).
Dufaux et al., "Abstract: Motion-compensated generic coding of video based on a multi resolution data structure," 2 pp. (1993) [downloaded from the World Wide Web on Jan. 25, 2006].
Gandhi et al, "Macroblock Adaptive Frame/Field Coding for Interlace Sequences," Input Document JVT-D108, Joint Video Team of ISO/IEC MPEG and ITU-T VCEG (ISO/IEC JTC/SC29/WG11 & ITU-T SG16 Q.6), 12 pp. (Document dated Jul. 2002).

(Continued)

*Primary Examiner*—Allen Wong
(74) *Attorney, Agent, or Firm*—Klarquist Sparkman, LLP

(57) ABSTRACT

For each of plural blocks (e.g., 8×16 blocks) in a source interlaced video frame, a video encoder measures vertical intensity level fluctuation between neighboring lines and between alternating lines in the block, and determines an interlace effect status value for the block. For example, the encoder calculates a ratio between the fluctuations of neighboring and alternating lines and compares the ratio with one or more thresholds. The encoder also can measure horizontal intensity level fluctuation and compare it with vertical intensity fluctuation. The encoder determines a frame-level interlace coding mode (e.g., frame mode or field mode) for the frame based at least in part on the interlace effect status values. The encoder can represent a frame-level interlace coding mode decision with a bitstream element, and a decoder can perform one or more video decoding functions based at least in part on the value of the bitstream element.

20 Claims, 11 Drawing Sheets

OTHER PUBLICATIONS

Sun et al., "Abstract: MPEG coding performance improvement by jointly optimizing coding mode decisions and rate control," 1 p. [downloaded from the World Wide Web on Jan. 25, 2006].

Wang et al, "Adaptive Frame/Field Coding for JVT," Input Document JVT-B071r2, Joint Video Team of ISO/IEC MPEG and ITU-T VCEG (ISO/IEC JTC/SC29/WG11 & ITU-T SG16 Q.6), 12 pp. (Document dated Feb. 2002).

Zhang et al., "Adaptive Field/Frame Selection for High Compression Coding," MERL TR-2003-29, 13 pp. (Jan. 2003).

"DivX Multi Standard Video Encoder," 2 pp. (Downloaded from the World Wide Web on Jan. 24, 2006).

ISO/IEC, "Information Technology—Coding of Audio-Visual Objects: Visual, ISO/IEC 14496-2, Committee Draft," 330 pp. (Mar. 1998).

ISO/IEC, "ISO/IEC 11172-2: Information Technology—Coding of Moving Pictures and Associated Audio for Storage Media at up to About 1.5 Mbit/s," 122 pp. ( Aug. 1993).

ITU-T, "ITU-T Recommendation H.261: Video Codec for Audiovisual Services at $p$ x 64 kbits," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

Joint Video Team of ISO/IEC MPEG and ITU-T VCEG, "Committee Draft of Joint Video Specification (ITU-T Recommendation H.264, ISO/IEC 14496-10 AVC," 142 pp. (Aug. 2002).

Microsoft Corporation, "Microsoft Debuts New Windows Media Player 9 Series, Redefining Digital Media on the PC," 4 pp. (document marked Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Sullivan et al., "The H.264/AVC Advanced Video Coding Standard: Overview and Introduction to the Fidelity Range Extensions," 21 pp. (Aug. 2004).

"The TML Project Web-Page and Archive," (including pages of code marked "image.cpp for H.26L decoder, Copyright 1999" and "image.c"), 24 pp. [Downloaded from the World Wide Web on Jun. 1, 2005].

Wang et al., "Interlace Coding Tools for H.26L Video Coding," ITU-T SG16/Q.6 VCEG-O37, pp. 1-20 (Dec. 2001).

Wien, "Variable Block-Size Transforms for Hybrid Video Coding," Dissertation, 182 pp. (Feb. 2004).

* cited by examiner

Figure 1, prior art
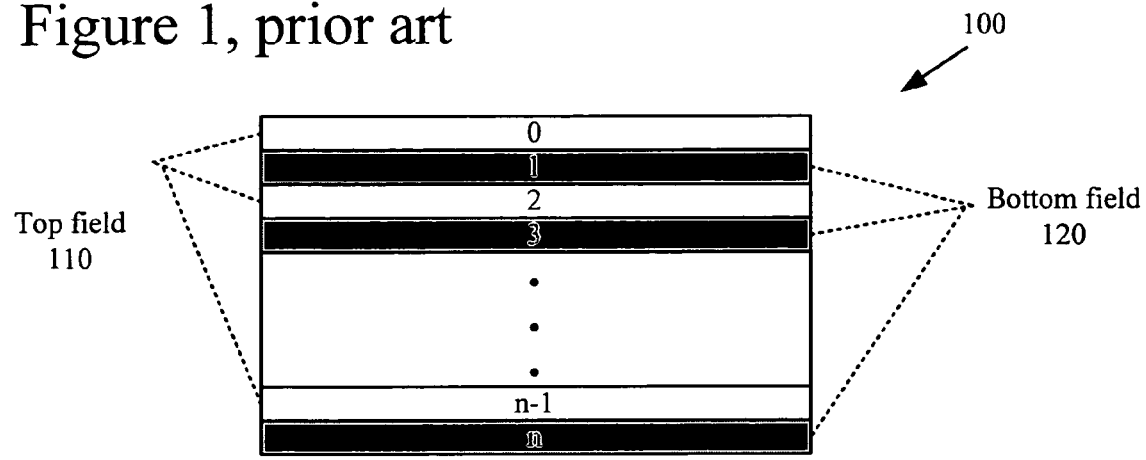
Figure 2
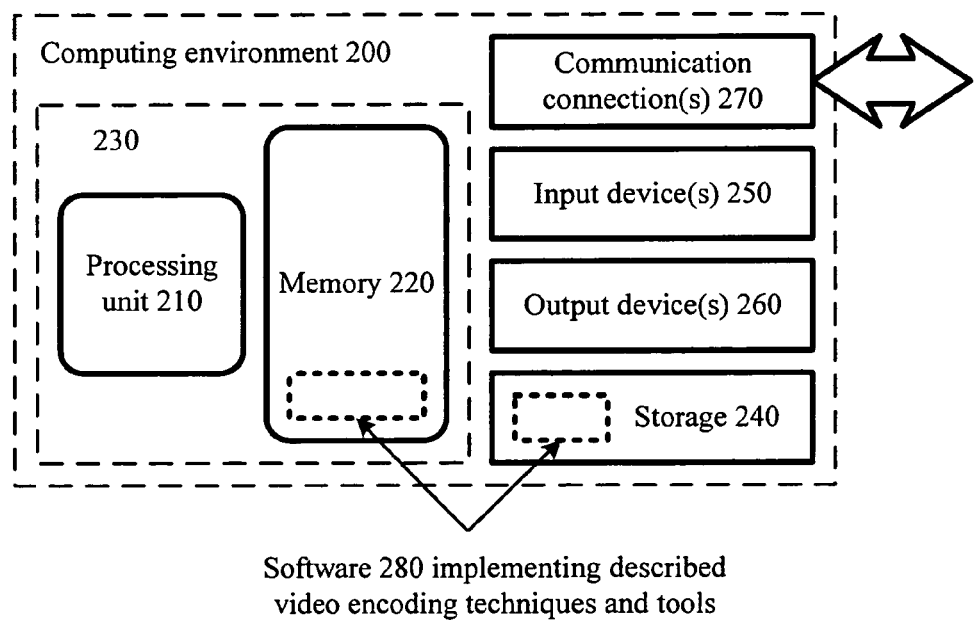
Software 280 implementing described video encoding techniques and tools Top field ▨
Bottom field ▮

Top field ▨
Bottom field ▮

Top field ▨
Bottom field ▮

T: Top field line   B: Bottom field line   ☐ : Luma value = 150   ☐ : Luma value = 50

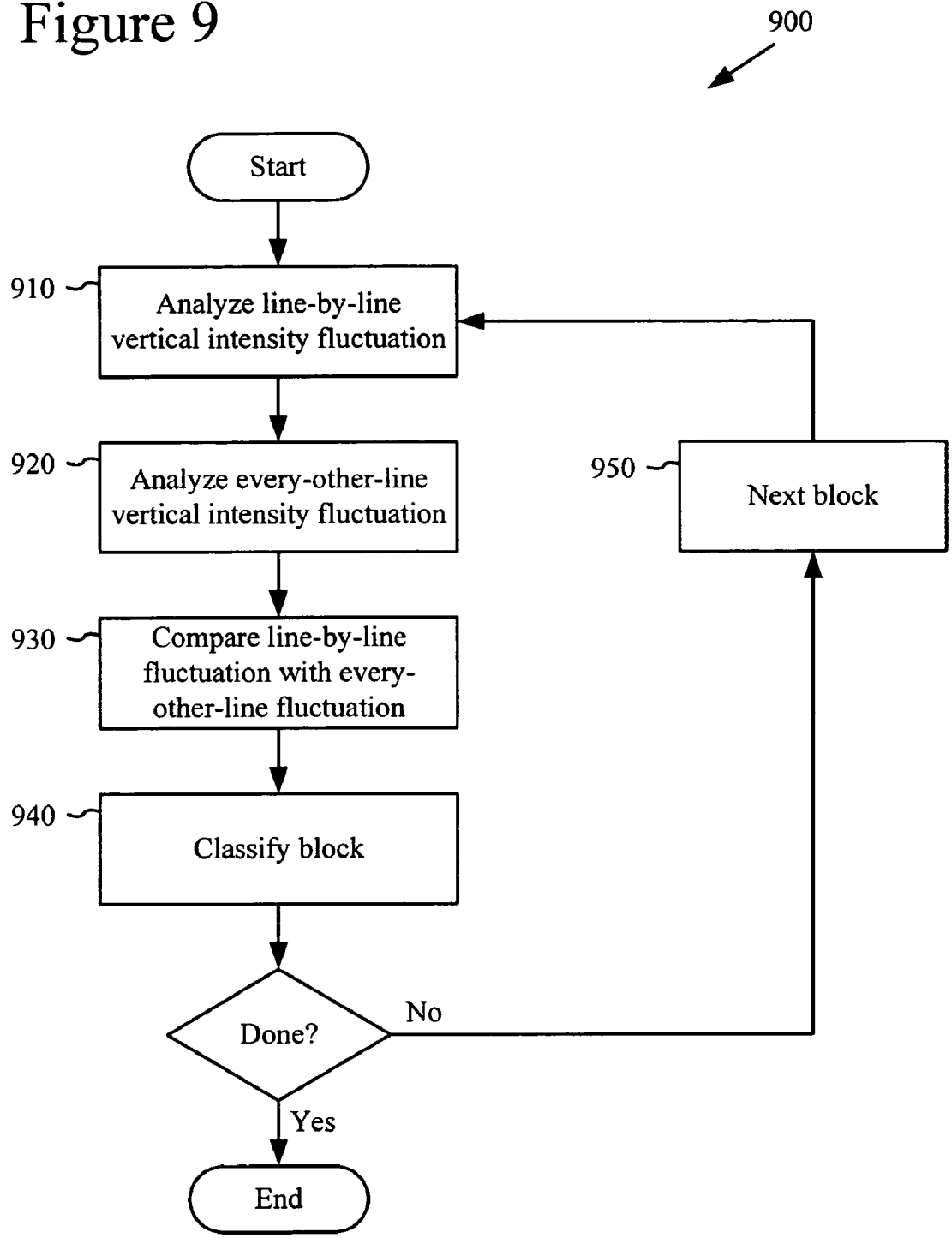

Sequence Layer Bitstream Syntax 1100

Frame Layer Progressive I-frame Bitstream Syntax 1200

Frame Layer
Interlace I-frame
Bitstream Syntax
1400

MAKING INTERLACE FRAME LEVEL CODING MODE DECISIONS

BACKGROUND

Digital video consumes large amounts of storage and transmission capacity. A typical raw digital video sequence includes 15 or 30 pictures per second. Each picture can include tens or hundreds of thousands of samples (sometimes grouped as pixels, or pels). Each pixel represents a tiny element of the picture. In raw form, a computer commonly represents a pixel with 24 bits or more. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include "intra" compression and "inter" or predictive compression. Intra compression techniques compress individual pictures. Inter compression techniques compress pictures with reference to preceding and/or following pictures.

A video frame contains lines of spatial information of a video signal. For progressive video, these lines contain samples starting from one time instant and continuing through successive lines to the bottom of the frame. A typical progressive video frame consists of one frame of content with non-alternating lines. A typical interlaced video frame consists of two fields scanned starting at different times. For example, referring to FIG. 1, an interlaced video frame 100 includes top field 110 and bottom field 120. In contrast to interlaced video, progressive video does not divide video frames into separate fields, and an entire frame is scanned left to right, top to bottom starting at a single time.

In a typical interlaced video frame, the even-numbered lines (top field) are scanned starting at one time (e.g., time t) and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure, with the odd lines grouped together in one field, and the even lines grouped together in another field. This arrangement, known as field coding, is useful in high-motion video for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved. When the decision is made to use frame coding for an interlaced video frame, some encoders allow individual macroblocks to be adaptively coded using either frame coding or field coding.

Different approaches have been tried to decide when to use frame coding and when to use field coding for interlaced video frames. For example, two-pass encoding algorithms encode the same interlaced video frame in separate paths using field coding and frame coding, respectively. The field coding results and frame coding results are then compared to determine which coding mode provides better rate-distortion performance. However, because they effectively encode interlaced video frames twice, two-pass algorithms are very expensive in terms of encoding time.

One-pass encoding algorithms typically determine whether to use field or frame coding before encoding the interlaced video frame. One such algorithm looks at individual frames within a sequence to determine whether each frame should be field-coded or frame-coded. The algorithm classifies an individual macroblock as a "field" macroblock or "frame" macroblock by comparing how far individual sample values in the top field and bottom field of the macroblock deviate from the mean sample values of the respective fields. If the difference between the deviation in the top field and the deviation in the bottom field is great enough, the algorithm determines that high motion is present and classifies the macroblock as a "field" macroblock. Otherwise, the macroblock is classified as a "frame" macroblock. The algorithm chooses field coding for the frame if the majority of its macroblocks are "field" macroblocks and chooses frame coding for the frame if the majority of its macroblocks are "frame" macroblocks. This algorithm measures variance in sample values in an attempt to detect motion, but it ignores other important content characteristics in making its field/from coding decision for the frame.

To make a field or frame coding decision for an interlaced video frame, a prior Microsoft video encoder divides interlaced frames into 8×4 blocks and analyzes each block in the spatial domain. For each block, the encoder checks if the vertical intensity fluctuation is more significant than the horizontal intensity fluctuation. Specifically, suppose p(r, c) represents the luminance value of a pixel at row r and column c. The encoder measures line-to-line vertical intensity fluctuation (V) and horizontal intensity level fluctuation (H) for the 8×4 block:

$$V = \sum_r \sum_c |p(r, c) - p(r+1, c)|$$

$$H = \sum_r \sum_c |p(r, c) - p(r, c+1)|.$$

For a block to be coded as progressive video, V should have similar value as H. If V is significantly larger than H, then there is a good indication of interlace effect and the block is classified as an "interlace" block. The encoder calculates the percentage of "interlace" blocks in the frame. If the percentage is greater than a threshold, the encoder selects field mode. Otherwise, the encoder selects frame mode.

This approach tends to classify blocks with strong vertical intensity fluctuations as "interlace" blocks regardless of whether the blocks actually have jagged, tooth-like interlace artifacts that can be alleviated by coding the interlaced frame in field mode. For example, blocks with horizontal edges that are mistakenly classified as "interlace" blocks will artificially skew the encoder's field mode/frame mode decision.

Given the critical importance of video compression to digital video, it is not surprising that video compression is a richly developed field. Whatever the benefits of previous video compression techniques, however, they do not have the advantages of the following techniques and tools.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to aspects of encoding interlaced video frames.

In one aspect, for each of plural blocks (e.g., 8×16 blocks) in a source interlaced video frame, a video encoder measures vertical intensity level fluctuation between neighboring lines in the block and measures vertical intensity level fluctuation between alternating lines in the block. The encoder determines an interlace effect status value for the block based at least in part on the vertical intensity level fluctuation of the neighboring lines and the vertical intensity level fluctuation of the alternating lines. For example, the encoder calculates a ratio between the vertical intensity level fluctuation of the neighboring lines and the vertical intensity level fluctuation of the alternating lines and compares the ratio with one or more thresholds. The encoder also can measure horizontal intensity level fluctuation and compare it with vertical intensity fluctuation. The encoder determines a frame-level interlace coding mode (e.g., frame mode or field mode) for the source interlaced video frame based at least in part on the interlace effect status values of the plural blocks. The encoder can represent a frame-level interlace coding mode decision with a bitstream element (e.g., at frame layer) in a bitstream. A decoder can then perform one or more video decoding functions based at least in part on the value of the bitstream element.

In another aspect, for each of plural blocks in a frame, an encoder sets a field/frame classification for the block based at least in part upon an intra-field vertical intensity fluctuation value for the block and an inter-field vertical intensity fluctuation value for the block, and sets a field/frame classification for the frame based at least in part upon the field/frame classifications for the plural blocks. The encoder also may base the field/frame classification for the block on a horizontal intensity fluctuation value for the block.

The foregoing and other objects, features, and advantages will become more apparent from the following detailed description, which proceeds with reference to the accompanying figures.

BRIEF DESCRIPTION OF THE DRAWINGS

FIG. 1 is a diagram showing an interlaced frame according to the prior art.

FIG. 2 is a block diagram of a suitable computing environment in conjunction with which several described embodiments may be implemented.

FIG. 9 is a flowchart showing a technique for classifying a block as an interlace effect block or a non-interlace effect block based on a comparison of line-by-line vertical intensity fluctuation and every-other-line vertical intensity fluctuation.

DETAILED DESCRIPTION

Figure 3:
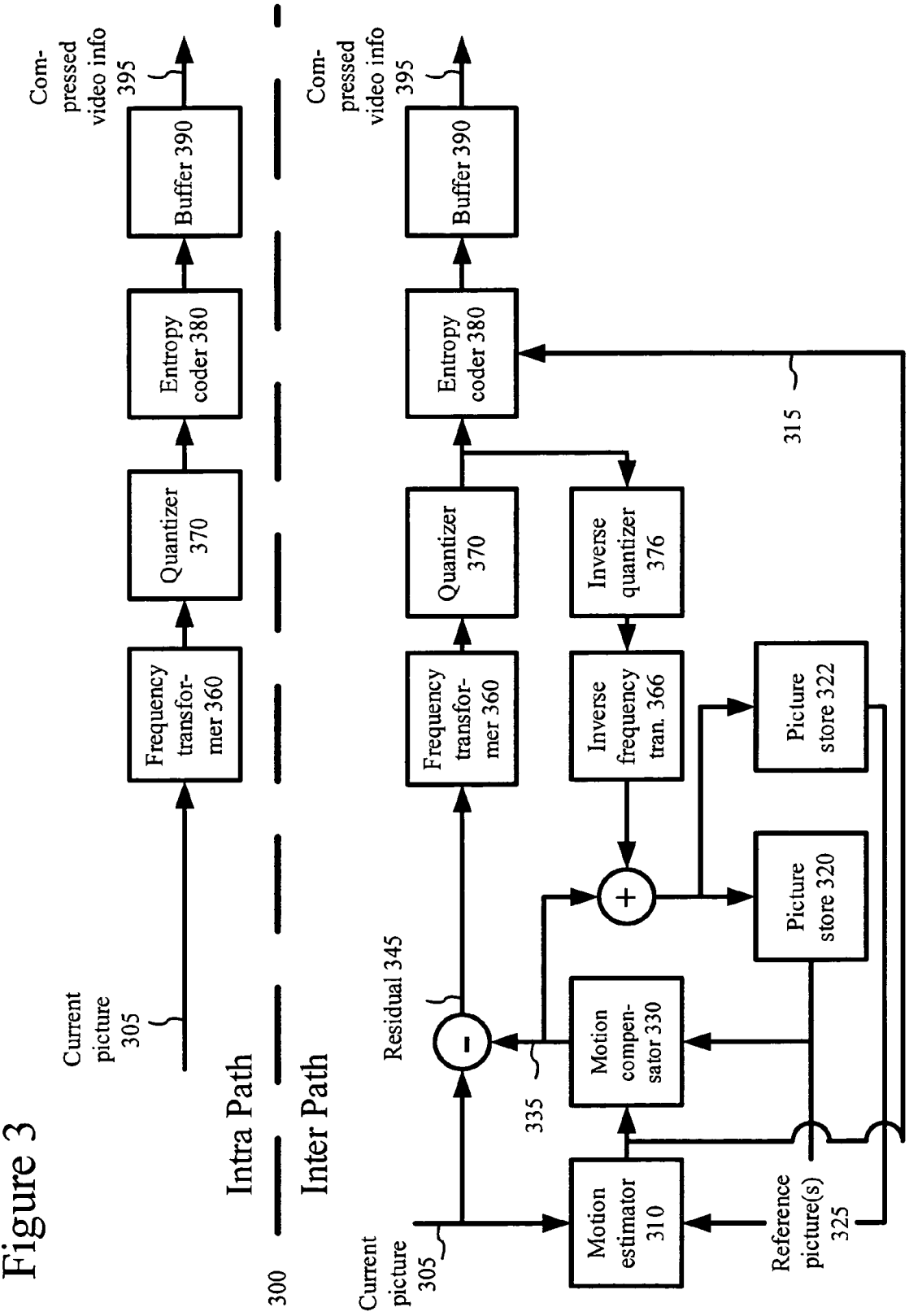
FIG. 3 is a block diagram of a generalized video encoder system in conjunction with which several described embodiments may be implemented.

The present application relates to techniques and tools for efficient compression and decompression of interlaced video. In various described embodiments, a video encoder incorporates techniques for encoding interlaced video.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

The various techniques and tools can be used in combination or independently. Different embodiments implement one or more of the described techniques and tools. Some techniques and tools described herein can be used in a video encoder, or in some other system not specifically limited to video encoding.

I. Computing Environment

FIG. 2 illustrates a generalized example of a suitable computing environment 200 in which several of the described embodiments may be implemented. The computing environment 200 is not intended to suggest any limitation as to scope of use or functionality, as the techniques and tools may be implemented in diverse general-purpose or special-purpose computing environments.

With reference to FIG. 2, the computing environment 200 includes at least one processing unit 210 and memory 220. In FIG. 2, this most basic configuration 230 is included within a dashed line. The processing unit 210 executes computer-executable instructions and may be a real or a virtual processor. In a multi-processing system, multiple processing units execute computer-executable instructions to increase processing power. The memory 220 may be volatile memory (e.g., registers, cache, RAM), non-volatile memory (e.g., ROM, EEPROM, flash memory, etc.), or some combination of the two. The memory 220 stores software 280 implementing a video encoder with one or more of the described techniques and tools.

A computing environment may have additional features. For example, the computing environment 200 includes storage 240, one or more input devices 250, one or more output devices 260, and one or more communication connections 270. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, DVDs, or any other medium which can be used to store information and which can be accessed within the computing environment 200. The storage 240 stores instructions for the software 280 implementing the video encoder.

The input device(s) 250 may be a touch input device such as a keyboard, mouse, pen, or trackball, a voice input device, a scanning device, or another device that provides input to the computing environment 200. For audio or video encoding, the input device(s) 250 may be a sound card, video card, TV tuner card, or similar device that accepts audio or video input in analog or digital form, or a CD-ROM or CD-RW that reads audio or video samples into the computing environment 200. The output device(s) 260 may be a display, printer, speaker, CD-writer, or another device that provides output from the computing environment 200.

The communication connection(s) 270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 200, computer-readable media include memory 220, storage 240, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "decide" and "analyze" to describe computer operations in a computing environment. These terms are high-level abstractions for operations performed by a computer, and should not be confused with acts performed by a human being. The actual computer operations corresponding to these terms vary depending on implementation.

II. Generalized Video Encoder

FIG. 3 is a block diagram of a generalized video encoder 300 in conjunction with which some described embodiments may be implemented. The encoder 300 receives a sequence of video pictures including a current picture 305 and produces compressed video information 395 as output to storage, a buffer, or a communication connection. The format of an output bitstream can be a Windows Media Video or VC-1 format, MPEG-x format (e.g., MPEG-1, MPEG-2, or MPEG-4), H.26x format (e.g., H.261, H.262, H.263, or H.264), or other format.

The encoder 300 processes video pictures, which may be video frames, video fields or combinations of frames and fields. The bitstream syntax and semantics at the picture and macroblock levels may depend on whether frames or fields are used. There may be changes to macroblock organization and overall timing as well. The encoder 300 is block-based and uses a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. The encoder 300 can perform operations on sets of samples of different size or configuration than 8×8 blocks and 16×16 macroblocks. For example, some described techniques and tools involve a frame/field coding decision for a interlaced video frame based on analysis of blocks of size 8×16 (i.e., blocks that are half the width of a 16×16 macroblock). These techniques and tools are described in detail below. Alternatively, the encoder 300 is object-based or uses a different macroblock or block format.

A. Video Frame Organizations

In some implementations, the encoder 300 processes video frames organized as follows. A frame contains lines of spatial information of a video signal. For progressive video, these lines contain samples starting from one time instant and continuing through successive lines to the bottom of the frame. A progressive video frame is divided into macroblocks such as the macroblock 400 shown in FIG. 4. The macroblock 400 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame typically coded using forward prediction. (Alternatively, progressive P-frames are not restricted to forward prediction.) A progressive B-frame is a progressive video frame typically coded using bi-directional prediction. (Alternatively, a progressive B-frame is not predicted from different temporal directions.) Progressive P- and B-frames may include intra-coded macroblocks as well as different types of predicted macroblocks.

Figure 5A:
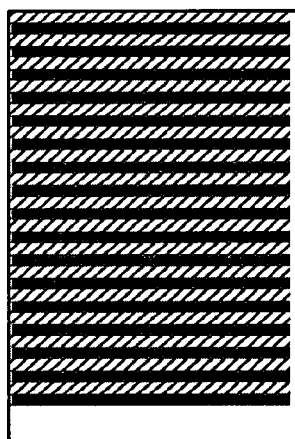
FIG. 5A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 5A shows part of an interlaced video frame 500, including the alternating lines of the top field and bottom field at the top left part of the interlaced video frame 500.

Figure 4:
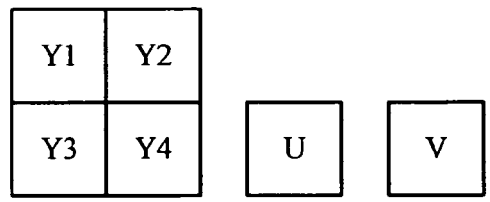
FIG. 4 is a diagram of a macroblock format used in several described embodiments.
Figure 5B:
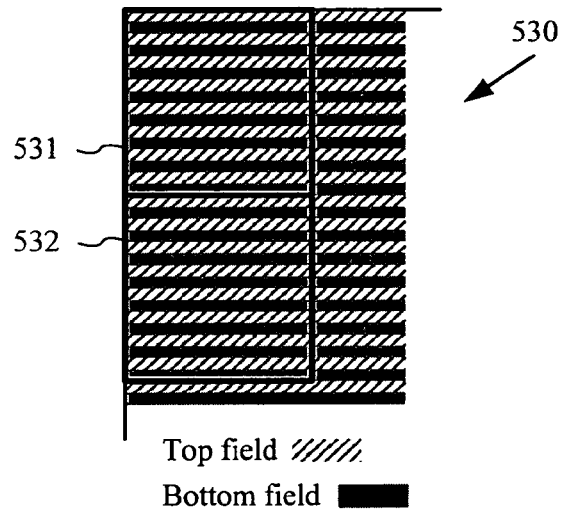
FIG. 5B is a diagram of the interlaced video frame organized for encoding/decoding as a frame.

FIG. 5B shows the interlaced video frame 500 of FIG. 5A organized for encoding/decoding as a frame 530. The interlaced video frame 500 has been partitioned into macroblocks such as the macroblocks 531 and 532, which use a 4:2:0 format as shown in FIG. 4. In the luminance plane, each macroblock 531, 532 includes 8 lines from the top field alternating with 8 lines from the bottom field for 16 lines total, and each line is 16 samples long. (The actual organization and placement of luminance blocks and chrominance blocks within the macroblocks 531, 532 are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame, typically coded using forward prediction. (Alternatively, interlaced P-frames are not restricted to forward prediction.) An interlaced B-frame is two fields of an interlaced video frame, typically coded using bi-directional prediction, where a macroblock includes information for the two fields. (Alternatively, an interlaced B-frame is not predicted from different temporal directions.) Interlaced P- and B-frames may include intra-coded macroblocks as well as different types of predicted macroblocks. Interlaced BI-frames are a hybrid of interlaced I-frames and interlaced B-frames; they are intra-coded, but are not used as anchors for other frames.

Figure 5C:
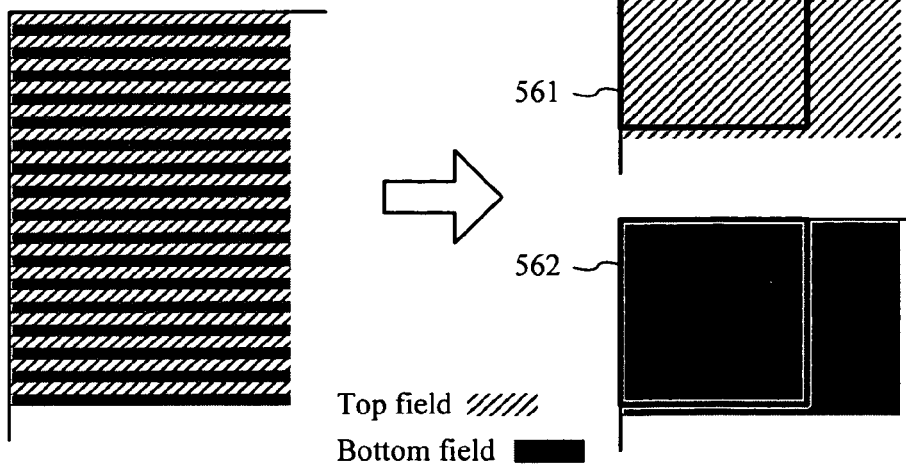
FIG. 5C is a diagram of the interlaced video frame organized for encoding/decoding as fields.

FIG. 5C shows the interlaced video frame 500 of FIG. 5A organized for encoding/decoding as fields 560. Each of the two fields of the interlaced video frame 500 is partitioned into macroblocks. The top field is partitioned into macroblocks such as the macroblock 561, and the bottom field is partitioned into macroblocks such as the macroblock 562. (Again, the macroblocks use a 4:2:0 format as shown in FIG. 4, and the organization and placement of luminance blocks and chrominance blocks within the macroblocks are not shown.) In the luminance plane, the macroblock 561 includes 16 lines from the top field and the macroblock 562 includes 16 lines from the bottom field, and each line is 16 samples long. An interlaced I-field is a single, separately represented field of an interlaced video frame. An interlaced P-field is a single, separately represented field of an interlaced video frame, typically coded using forward prediction. (Alternatively, interlaced P-fields are not restricted to forward prediction.) An interlaced B-field is a single, separately represented field of an interlaced video frame, typically coded using bi-directional prediction. (Alternatively, an interlaced B-field is not predicted from different temporal directions.) Interlaced P- and B-fields may include intra-coded macroblocks as well as different types of predicted macroblocks. Interlaced BI-fields are a hybrid of interlaced I-fields and interlaced B-fields; they are intra-coded, but are not used as anchors for other fields.

Interlaced video frames organized for encoding/decoding as fields can include various combinations of different field types. For example, such a frame can have the same field type in both the top and bottom fields or different field types in each field. In one implementation, the possible combinations of field types include I/I, I/P, P/I, P/P, B/B, B/BI, BI/B, and BI/BI.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

B. Video Encoder

FIG. 3 is a block diagram of a generalized video encoder system 300. The encoder system 300 receives a sequence of video pictures including a current picture 305 (e.g., progressive video frame, interlaced video frame, or field of an interlaced video frame), and produces compressed video information 395 as output. Particular embodiments of video encoders typically use a variation or supplemented version of the generalized encoder 300.

The encoder system 300 compresses predicted pictures and key pictures. For the sake of presentation, FIG. 3 shows a path for key pictures through the encoder system 300 and a path for predicted pictures. Many of the components of the encoder system 300 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 305 is a predicted picture, a motion estimator 310 estimates motion of macroblocks or other sets of samples of the current picture 305 with respect to one or more reference pictures, for example, the reconstructed previous picture 325 buffered in the picture store 320. If the current picture 305 is a bi-predictive picture, a motion estimator 310 estimates motion in the current picture 305 with respect to up to four reconstructed reference pictures (for an interlaced B-field, for example). Typically, a motion estimator estimates motion in a B-picture with respect to one or more temporally previous reference pictures and one or more temporally future reference pictures, but B-pictures need not be predicted from different temporal directions. The encoder system 300 can use the separate stores 320 and 322 for multiple reference pictures.

The motion estimator 310 can estimate motion by full-sample, ½-sample, ¼-sample, or other increments, and can switch the precision of the motion estimation on a picture-by-picture basis or other basis. The motion estimator 310 (and compensator 330) also can switch between types of reference picture sample interpolation (e.g., between bicubic and bilinear) on a per-frame or other basis. The precision of the motion estimation can be the same or different horizontally and vertically. The motion estimator 310 outputs as side information motion information 315 such as differential motion vector information. The encoder 300 encodes the motion information 315 by, for example, computing one or more predictors for motion vectors, computing differentials between the motion vectors and predictors, and entropy coding the differentials. To reconstruct a motion vector, a motion compensator 330 combines a predictor with differential motion vector information.

The motion compensator 330 applies the reconstructed motion vector to the reconstructed picture(s) 325 to form a motion-compensated current picture 335. The prediction is rarely perfect, however, and the difference between the motion-compensated current picture 335 and the original current picture 305 is the prediction residual 345. During later reconstruction of the picture, the prediction residual 345 is added to the motion compensated current picture 335 to obtain a reconstructed picture that is closer to the original current picture 305. In lossy compression, however, some information is still lost from the original current picture 305. Alternatively, a motion estimator and motion compensator apply another type of motion estimation/compensation.

A frequency transformer 360 converts the spatial domain video information into frequency domain (i.e., spectral) data.

For block-based video pictures, the frequency transformer 360 applies a DCT, variant of DCT, or other block transform to blocks of the sample data or prediction residual data, producing blocks of frequency transform coefficients. Alternatively, the frequency transformer 360 applies another conventional frequency transform such as a Fourier transform or uses wavelet or sub-band analysis. The frequency transformer 360 may apply an 8×8, 8×4, 4×8, 4×4 or other size frequency transform.

A quantizer 370 then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 300 can use frame dropping, adaptive filtering, or other techniques for rate control.

The encoder 300 may use special signaling for a skipped macroblock, which is a macroblock that has no information of certain types (e.g., no differential motion vectors for the macroblock and no residual information).

When a reconstructed current picture is needed for subsequent motion estimation/compensation, an inverse quantizer 376 performs inverse quantization on the quantized spectral data coefficients. An inverse frequency transformer 366 then performs the inverse of the operations of the frequency transformer 360, producing a reconstructed prediction residual (for a predicted picture) or a reconstructed key picture. If the current picture 305 was a key picture, the reconstructed key picture is taken as the reconstructed current picture (not shown). If the current picture 305 was a predicted picture, the reconstructed prediction residual is added to the motion-compensated current picture 335 to form the reconstructed current picture. One or both of the picture stores 320, 322 buffers the reconstructed current picture for use in motion compensated prediction. In some embodiments, the encoder applies a de-blocking filter to the reconstructed frame to adaptively smooth discontinuities and other artifacts in the picture.

The entropy coder 380 compresses the output of the quantizer 370 as well as certain side information (e.g., motion information 315, quantization step size). Typical entropy coding techniques include arithmetic coding, differential coding, Huffman coding, run length coding, LZ coding, dictionary coding, and combinations of the above. The entropy coder 380 typically uses different coding techniques for different kinds of information (e.g., DC coefficients, AC coefficients, different kinds of side information), and can choose from among multiple code tables within a particular coding technique.

The entropy coder 380 provides compressed video information 395 to the multiplexer ("MUX") 390. The MUX 390 may include a buffer, and a buffer level indicator may be fed back to a controller. Before or after the MUX 390, the compressed video information 395 can be channel coded for transmission over the network. The channel coding can apply error detection and correction data to the compressed video information 395.

A controller (not shown) receives inputs from various modules such as the motion estimator 310, frequency transformer 360, quantizer 370, inverse quantizer 376, entropy coder 380, and buffer 390. The controller evaluates intermediate results during encoding, for example, estimating distortion and performing other rate-distortion analysis. The controller works with modules such as the motion estimator 310, frequency transformer 360, quantizer 370, and entropy coder 380 to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

The relationships shown between modules within the encoder 300 indicate general flows of information in the encoder; other relationships are not shown for the sake of simplicity. In particular, FIG. 3 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder 300. Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Interlace Frame-level Coding Mode Decision

An interlaced video frame consists of two fields of alternating lines. For example, referring again to FIG. 1, an interlaced video frame 100 includes top field 110 and bottom field 120. In a typical interlaced video frame, the top field is scanned starting at one time (e.g., time t) and the bottom field is scanned starting at a different (typically later) time (e.g., time t+1). This timing can create jagged, comb-like features (referred to herein as interlace effects) in regions of an interlaced video frame where motion is present. For this reason, interlaced video frames can be rearranged according to a field structure, with the odd lines grouped together in one field, and the even lines grouped together in another field. This arrangement, known as field coding, is useful in high-motion pictures for reduction of such jagged edge artifacts. (In field coding mode, macroblocks are coded as individual fields.)

On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved. (In frame coding mode, macroblocks are coded as individual fields or as whole macroblocks.)

Therefore, a video encoder that encodes interlaced video frames can make a frame-level coding mode decision per frame between field coding and frame coding.

To achieve high coding efficiency, it is important to select the appropriate frame-level coding mode and make such selection efficiently. Accordingly, described techniques and tools include a new, quantitative method for selecting between the field and frame coding modes. More specifically, described techniques and tools look for interlace effects in an interlaced frame, rather than looking for simple differences in pixel value variances or generic motion in the frame. If interlace effects are detected in the interlaced frame, the encoder can choose to use field coding to encode the interlaced video frame. For example, the encoder checks individual blocks (e.g., 8×16 blocks) for interlace effects and determines whether the number of interlace effect blocks is sufficient to justify using field coding to encode the interlaced video frame. Described techniques and tools improve rate-distortion performance when encoding interlaced content by significantly improving the accuracy of the decision between field coding and frame coding modes. Test results show significant improvement in rate-distortion performance when encoding interlaced content using one or more described techniques and tools.

Figure 6:
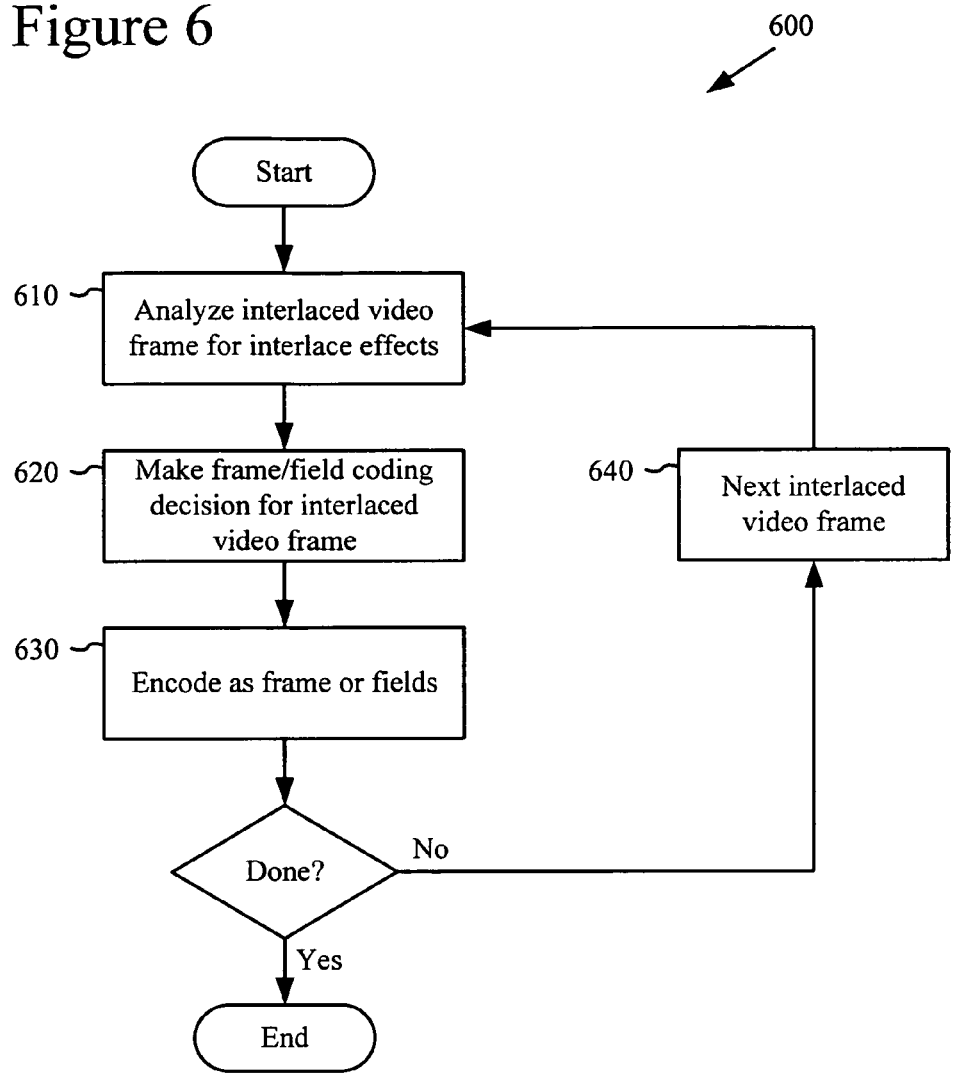
FIG. 6 is a flow chart showing a technique for making a frame-level coding mode decision by analyzing an interlaced video frame for interlace effects.

FIG. 6 shows a technique 600 for making a frame-level coding mode decision. At 610, an encoder analyzes an interlaced video frame for interlace effects. For example, the encoder classifies 8×16 blocks in the frame as either interlace effect blocks or non-interlace effect blocks based on one or more decision rules. At 620, the encoder then makes a frame-level coding mode decision based at least in part on the analysis in 610. For example, the encoder compares the percentage of interlace effect blocks in the frame with a threshold, makes the frame-level coding mode decision based on the comparison. At 630, the encoder encodes the interlaced video frame as a frame or as individual fields, depending on the frame-level coding mode decision. At 640, the encoder takes the next frame if there other frames left to encode and makes a frame-level coding mode decision for the next frame.

Figure 7:
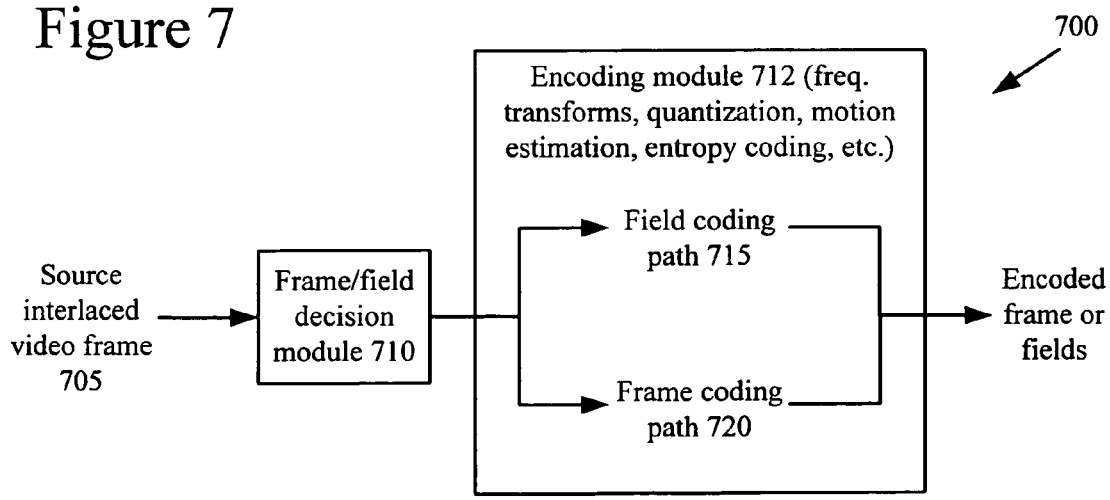
FIG. 7 is a block diagram of a video encoder system in which described techniques and tools for making frame-level coding mode decisions can be implemented.

FIG. 7 is a block diagram of a video encoder system 700 in which described techniques and tools for making frame-level coding mode decisions can be implemented. The encoder system 700 takes a source interlaced video frame 705 and makes a frame-level coding mode decision in frame/field mode decision module 710. Once the decision is made, the encoder system 700 uses encoding module 712 to perform various encoding tasks such as frequency transforms, quantization, motion estimation/compensation, entropy coding and other tasks, as appropriate. For example, the encoding module 812 includes modules shown in the encoder system 300 of FIG. 3. Depending on the frame-level coding mode decision, the encoder system 700 uses the field coding path 715 or the frame coding path 720 to generate either two encoded fields or an encoded frame, respectively.

In one implementation, each source interlaced video frame is divided into blocks. Blocks are classified as interlace effect blocks or non-interlace effect blocks based on analysis of the blocks. For example, changes in luma (or intensity) values in the vertical direction and/or horizontal direction are analyzed, and blocks are classified based at least in part on that analysis. The source frame is analyzed to determine how many interlace effect blocks are present in the frame. If the proportion of interlace effect blocks is high enough, field coding is selected for the frame. Otherwise, frame coding is selected.

A. Block-level Interlace Effect Detection

An encoder uses one or more decision rules to help the encoder choose a coding mode based on the proportion of the frame that has interlace effects. The frame-level coding mode decision mechanism can be divided conceptually into two stages.

In one stage, an interlaced video frame is divided into blocks of a size such as 8×16 (i.e., blocks that are half the width of a 16×16 macroblock). Each block is analyzed in the spatial domain. The analysis provides results for later field/frame decision rules. One decision rule is based on the concept that field coding should be used if "zig-zag" or "combing" effects (caused by motion in interlaced video frames) are disproportionately present compared to vertical intensity fluctuations caused by horizontal edges in the content. In one implementation, the blocks are analyzed in raster scan order. Alternatively, the blocks can be analyzed in some other order, or blocks in the frame can be selectively sub-sampled (e.g., according to a pre-set or adaptive sub-sampling grid of blocks in the frame) and analyzed, and the frame-level coding mode decision can be based on the classifications of the sub-sampled blocks.

In another stage, a percentage or count of interlace effect blocks is used to decide the frame-level coding mode.

Figure 8A:
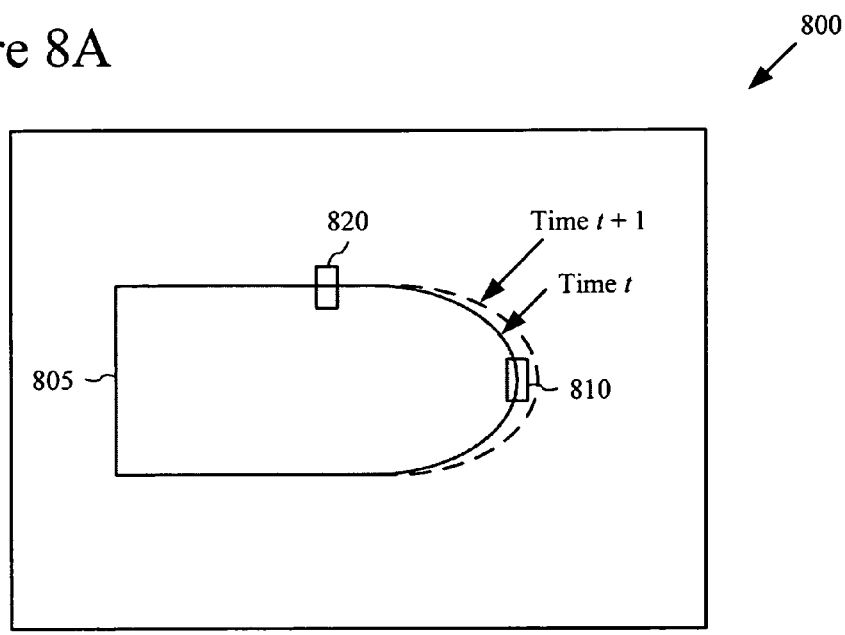
FIGS. 8A and 8B are diagrams showing an interlaced video frame with interlace effects caused by motion in the frame.

FIG. 8A is a diagram of an interlaced video frame 800 with interlace effects caused by horizontal motion in the frame. In the interlaced video frame 800, a dark object 805 is moving from left to right across a light background. The shaded circle represents the position of the object 805 at time t, when the top field is scanned. The dashed circle (shading not shown) represents the position of the dark object 805 at time t+1, when the bottom field is scanned. Because the two fields are scanned beginning at different times, an interlace effect is present in parts of frame 800, such as the 8×16 block 810. In contrast, an interlace effect is not present in other parts of frame 800, such as block 820 at the top edge of the object 805. This is illustrated in more detail in FIG. 8B.

Figure 8B:
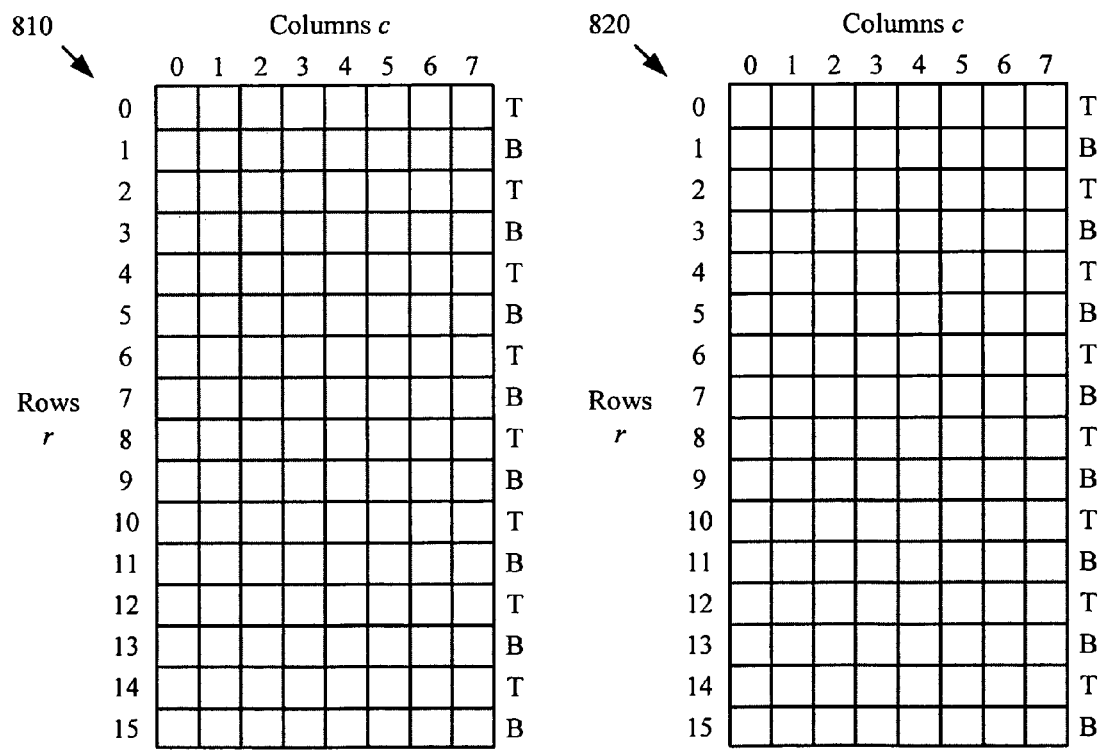

The luma samples of the 8×16 blocks 810 and 820 are represented with shaded or white squares in FIG. 8B. The shaded squares represent luma samples with a value of 50, and the white squares represent luma samples with a value of 150. Each of the luma sample values in the bottom field of block 810 is equal to 50. The luma samples in the top field of block 810 are either 50 or 150, and the relative size of the light and dark regions varies slightly among the different top field lines of the block. Although the three leftmost columns of luma samples in block 810 each have the same value, the other five columns exhibit interlace effects.

In contrast, regardless of the motion, block 820 at the top edge of the object 805 has shaded values in lines of both fields below the horizontal edge, and the block has light values in lines of both fields above the edge.

Suppose p(r,c) represents a luma sample value at row r and column c, and N represents the total number of samples used in the calculation for the current block. The vertical intensity fluctuation quantities $v_1$ and $v_2$ for the current block are calculated as shown below:

$$v_1 = \sum_r \sum_c \max(|p(r, c) - p(r+1, c)|, |p(r+1, c) - p(r+2, c)|) \quad (1)$$

$$v_2 = \sum_r \sum_c |p(r, c) - p(r+2, c)| \quad (2)$$

In Equation (1), $v_1$ measures line-to-line vertical intensity (or luma) fluctuation of the block. (The max( ) operator in Equation (1) is to reduce the effect of noise, especially when there are slanted edges in the block.) In Equation (2), $v_2$ measures every-other-line vertical intensity fluctuation of the block. Because neighboring lines of an interlaced video frame are from different fields, a measurement of line-to-line vertical intensity fluctuation measures fluctuation between lines in different fields, while a measurement of every-other-line vertical intensity fluctuation measures fluctuation between lines in the same field. Calculating $v_1$ and $v_2$ helps to differentiate horizontal edges from "zig-zag" or "combing" effects present in interlaced video frames with horizontal motion. Alternatively, the encoder uses other measurements of inter-field vertical intensity fluctuations and intra-field vertical intensity fluctuations.

For progressive (non-interlace effect) video, $v_1$ should be smaller than or equal to $v_2$. If $v_1$ is significantly larger than $v_2$, the measurements indicate interlace effects in the block. When $v_1$ is larger than $v_2$, but not significantly larger, a secondary rule is deployed.

For example, referring again to FIG. 8B, $v_1$ (which measures line-by-line intensity fluctuation) is significantly larger than $v_2$ (which measures every-other-line intensity fluctuation) for block 810, which exhibits an interlace effect. There is substantial line-by-line intensity fluctuation in block 810, but the values in the top field lines vary only slightly, and the values in the bottom field lines are all the same. In contrast, $v_1$ is about equal to $v_2$ for block 820, which does not exhibit an interlace effect. The neighboring lines in block 820 are all identical to one another in terms of intensity values, except for rows 7 and 8. Each top field line in block 820 is identical to the next lower top field line in block 820, except for rows 6 and 8. Similarly, each bottom field line in block 820 is identical to the next lower bottom field line in block 820, except for rows 7 and 9.

FIG. 9 is a flowchart showing a technique 900 for classifying a block as an interlace effect block or a non-interlace effect block based on a comparison of line-by-line (neighboring line) vertical intensity fluctuation and every-other-line (alternating line) vertical intensity fluctuation. At 910, an encoder analyzes line-by-line vertical intensity fluctuation. For example, the encoder calculates line-by-line vertical intensity fluctuation according to Equation (1) above, or the encoder uses some other technique to calculate this fluctuation. At 920, the encoder analyzes every-other-line vertical intensity fluctuation. For example, the encoder calculates every-other-line vertical intensity fluctuation according to Equation (2) above, or the encoder uses some other technique to calculate this fluctuation.

The encoder classifies the block at 930 based at least in part on the two kinds of vertical intensity fluctuation that were analyzed at 910 and 920. For example, the encoder assigns an interlace effect status value to the block after calculating a ratio between the line-by-line vertical intensity fluctuation and the every-other-line vertical intensity fluctuation. If there are more blocks to classify, the encoder analyzes the next block (950). The results of the block classification can be used to make a frame-level coding mode decision for the frame.

In one implementation, the encoder computes the ratio $V_{ratio}$ to decide whether a block has interlace effects, as shown in Equation (4), below:

$$V_{ratio} = \frac{v_1 + N}{v_2 + N}, \quad (3)$$

where N is the total number of samples participating in the calculation in the current block. A threshold for $V_{ratio}$ can be used to separate interlace effect blocks from non-interlace effect blocks.

Or, the encoder can use multiple decision rules and/or thresholds. For example, in one implementation, thresholds $VT_1$ and $VT_2$ are used, where $VT_1 > VT_2$.

When $v_1$ is larger than $v_2$, but not significantly larger (e.g., $V_{ratio}$ is between the thresholds $VT_1$ and $VT_2$), a secondary rule is deployed to improve the robustness of the algorithm. The secondary rule is that in order to be classified as an "interlace effect" block, the inter-field vertical intensity fluctuation should be more significant than the horizontal intensity fluctuation.

In one implementation, the quantity h for the current block is calculated as shown below:

$$h = \sum_r \sum_c |p(r, c) - p(r, c+1)| \quad (4)$$

h measures horizontal intensity level fluctuation. Alternatively, the encoder uses another measurement of horizontal intensity fluctuation or does not use horizontal intensity fluctuation to classify the current block. If $v_1$ is significantly larger than h, the difference is likely to be caused by interlace effects. Thus, in one implementation, the encoder computes the ratio $VH_{ratio}$ to decide whether a block has interlace effects in a secondary decision rule.

$$VH_{ratio} = \frac{v_1 + N}{h + N} \quad (5)$$

$VH_{ratio}$ is compared with another threshold HT in the secondary rule to improve decision robustness. Specifically, according to the following pseudocode,

```
if (V_ratio > VT_1)
    classify block as "interlace"
else if (V_ratio <= VT_1 and V_ratio > VT_2 and VH_ratio > HT)
    classify block as "interlace"
else
    classify block as "non-interlace."
```

Figure 10:
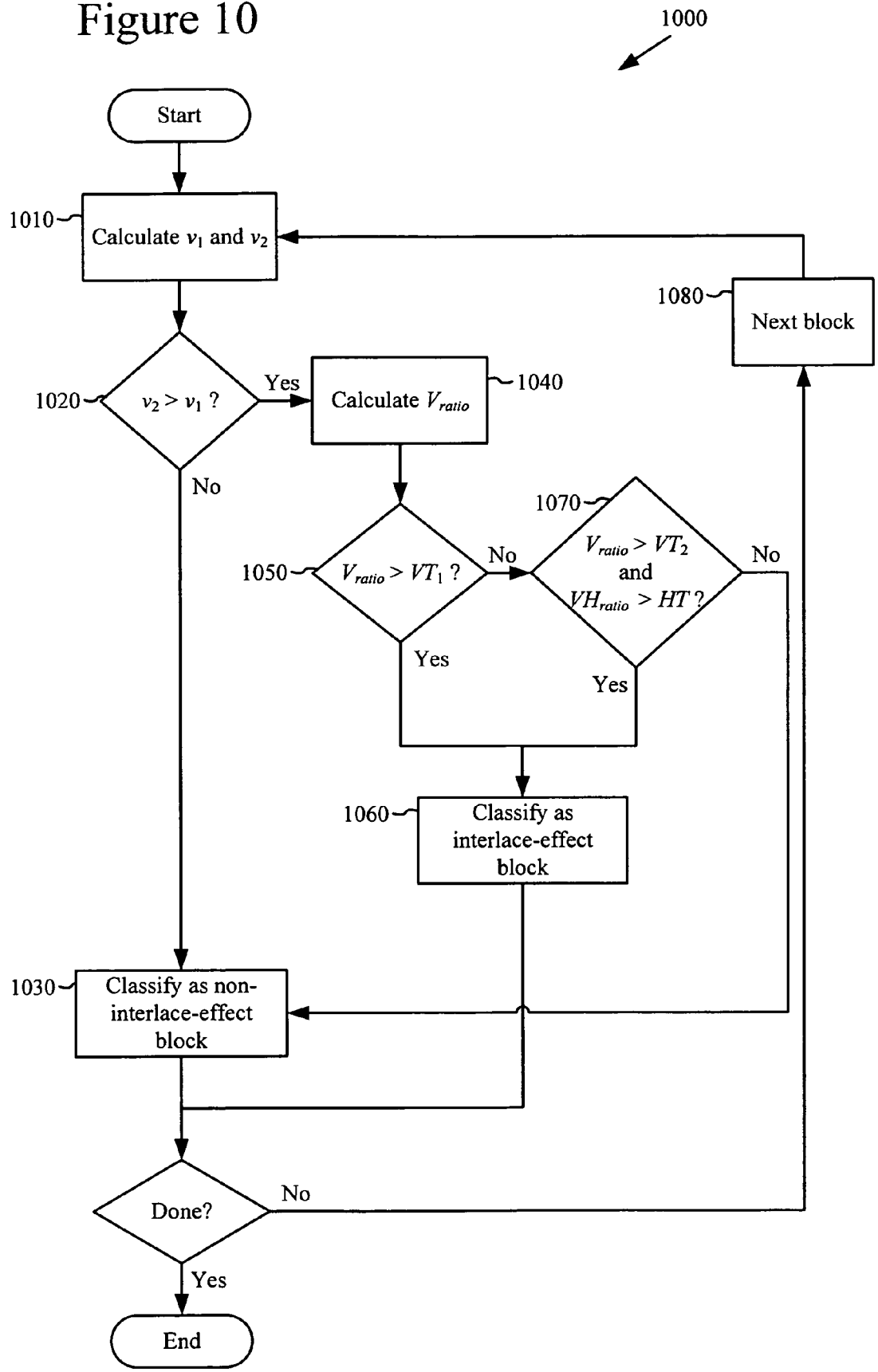
FIG. 10 is a flowchart showing a technique for classifying a block as an interlace effect block or a non-interlace effect block based on a comparison of line-by-line vertical intensity fluctuation, every-other-line vertical intensity fluctuation, and horizontal intensity fluctuation.

FIG. 10 is a flowchart showing a technique 1000 for classifying a block as an interlace effect block or a non-interlace effect block based on a comparison of line-by-line vertical intensity fluctuation, every-other-line vertical intensity fluctuation, and horizontal intensity fluctuation. In the example shown in FIG. 10, at 1010 an encoder calculates line-by-line vertical intensity fluctuation ($v_1$) and every-other-line vertical intensity fluctuation ($v_2$) for a current block. At 1020, the encoder determines whether $v_2$ is greater than $v_1$. If it is, the encoder classifies the current block as a non-interlace effect block at 1030. Although vertical intensity fluctuations are represented by $v_1$ and $v_2$ in blocks 1010 and 1020, the encoder need not use Equations (1) and (2) to measure these fluctuations, and instead may measure them in other ways.

At 1040, if $v_2$ is not greater than $v_1$ the encoder calculates a ratio between the line-by-line vertical intensity fluctuation and the every-other-line vertical intensity fluctuation ($V_{ratio}$). Although this ratio is represented by $V_{ratio}$ in FIG. 10, the encoder need not use Equation (3) to calculate such a ratio. For example, the ratio can be calculated without regard to N or in some other way.

The encoder compares $V_{ratio}$ with a threshold ($VT_1$) at 1050. If the ratio exceeds $VT_1$, the encoder classifies the current block as an interlace effect block at 1060. If not, the encoder compares $V_{ratio}$ with a second, lower threshold ($VT_2$) and compares $VH_{ratio}$ with another threshold, HT, at 1070. If $V_{ratio}$ is greater than $VT_2$ and $VH_{ratio}$ is greater than HT, the encoder classifies the current block as an interlace effect block at 1060. If not, the encoder classifies the current block as a non-interlace effect block at 1030. If there are more blocks to classify, the encoder analyzes the next block (1080). The results of the block classification can be used to make a frame-level coding mode decision for the frame.

In one implementation, $VT_1$ is approximately equal to 1.5, $VT_2$ is approximately equal to 1.2, and HT is approximately equal to 2. However, other values can be used for these thresholds. Alternatively, one or more of these thresholds can be omitted from the decision process. For example, an encoder may classify the current block without comparing $V_{ratio}$ with a second threshold. Or, the encoder may classify the current block without reference to HT.

$VH_{ratio}$ represents a ratio between line-by-line vertical intensity fluctuation and the horizontal intensity fluctuation in FIG. 10. However, the encoder need not use Equations (4) and (5) to calculate such a ratio. For example, the ratio can be calculated without regard to N, or the horizontal intensity fluctuation may be measured differently. As another alternative, the encoder can ignore horizontal intensity fluctuation.

B. Frame-level Coding Mode Decision

In another stage, an encoder determines whether the interlace effect blocks in the frame are enough to justify a frame-level coding mode decision that will help to reduce interlace effect artifacts in the frame. For example, a percentage of interlace effect blocks in the frame is calculated. A threshold percentage is used to make the coding mode decision: if the measured percentage of interlace effect blocks is greater than the threshold percentage, field coding mode is selected, otherwise, frame coding mode is selected. Or, the encoder counts the number of blocks that have been classified as interlace effect blocks until some threshold number of interlace effect blocks is reached. When the threshold number is reached, the encoder determines it will code the frame in field coding mode and can stop analyzing blocks for interlace effects. If the threshold number is not reached, the encoder encodes the frame in frame coding mode.

In one implementation, the encoder encodes the frame in field coding mode if 20% of the blocks in the frame are interlace effect blocks. The encoder stops analyzing blocks for interlace effects once the 20% threshold has been reached. Other thresholds also can be used. For example, the threshold can be raised or lowered to adjust for different kinds of video content or different rate-distortion criteria.

C. Testing

This algorithm has been tested on over 30 interlace video sequences. Rate-distortion curves show clear improvement (0.5 dB on average) over the previous method.

IV. Example Bitstream Syntax and Semantics

A bitstream syntax and semantics that can be used in combination with described techniques and tools are now described. For example, the bitstream syntax and semantics described below can be used by an encoder to encode a bitstream for a video decoder that decodes either progressive or interlaced content, and treats frame-coded interlaced content differently than field-coded interlaced content.

A. Bitstream Syntax

Data is presented in the form of a bitstream having plural layers (e.g., sequence, entry point, frame, field, macroblock, block and/or sub-block layers).

In the syntax diagrams shown in FIGS. 11-14, arrow paths show the possible flows of syntax elements. Syntax elements shown with square-edged boundaries indicate fixed-length syntax elements; those with rounded boundaries indicate variable-length syntax elements and those with a rounded boundary within an outer rounded boundary indicate a syntax element (e.g., a bitplane) made up of simpler syntax elements. A fixed-length syntax element is defined to be a syntax element for which the length of the syntax element is not dependent on data in the syntax element itself; the length of a fixed-length syntax element is either constant or determined by prior data in the syntax flow. A lower layer in a layer diagram (e.g., a macroblock layer in a frame-layer diagram) is indicated by a rectangle within a rectangle.

Figure 11:
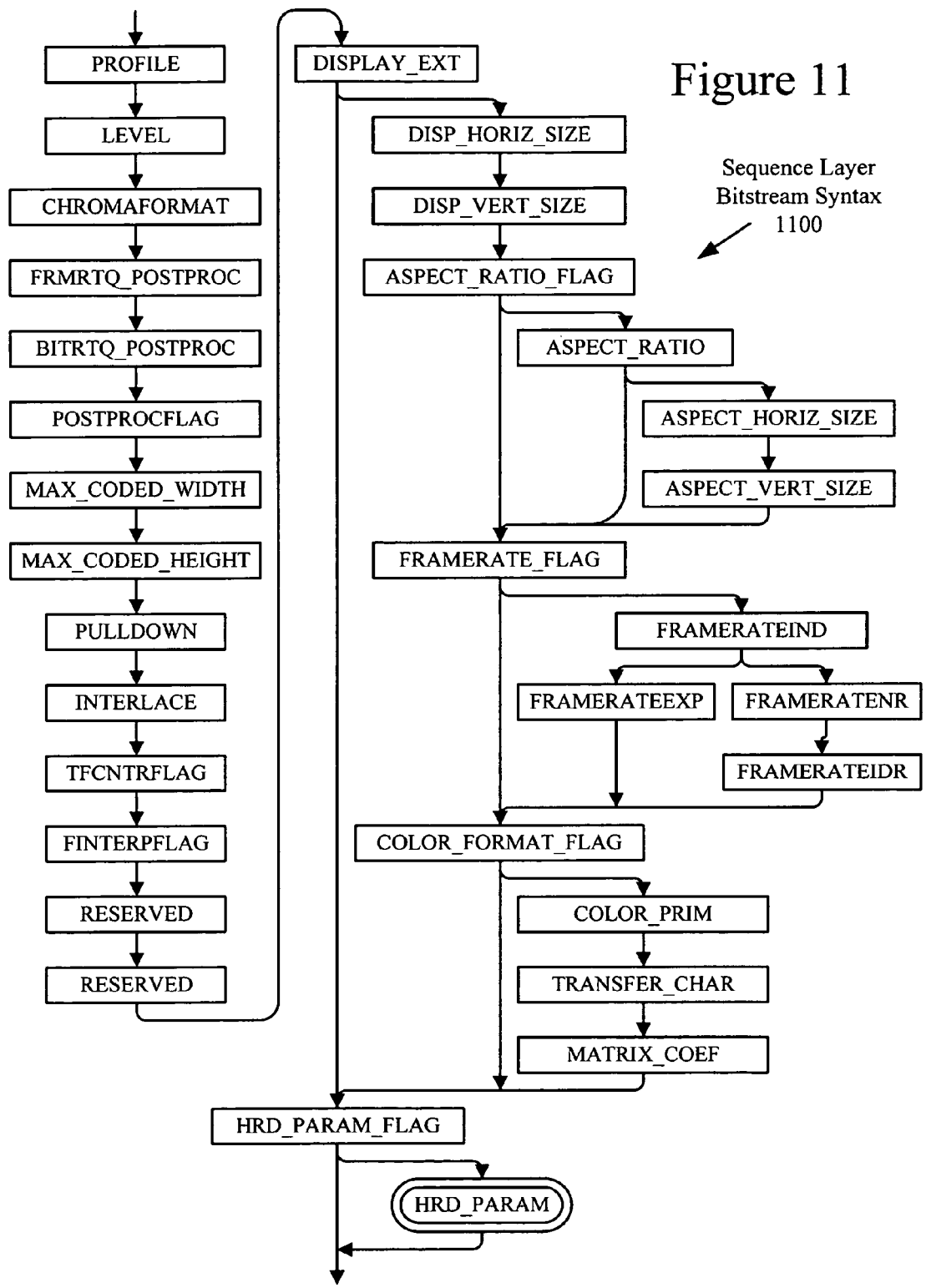
FIG. 11 is a diagram showing a sequence-layer bitstream syntax in a combined implementation.

Sequence-level bitstream elements are shown in FIG. 11. Sequence-level elements are used to decode a sequence of compressed video frames. Sequence-level data can affect the interpretation or presence of elements at other levels (e.g., entry point level, frame level, macroblock level, etc.).

Figure 12:
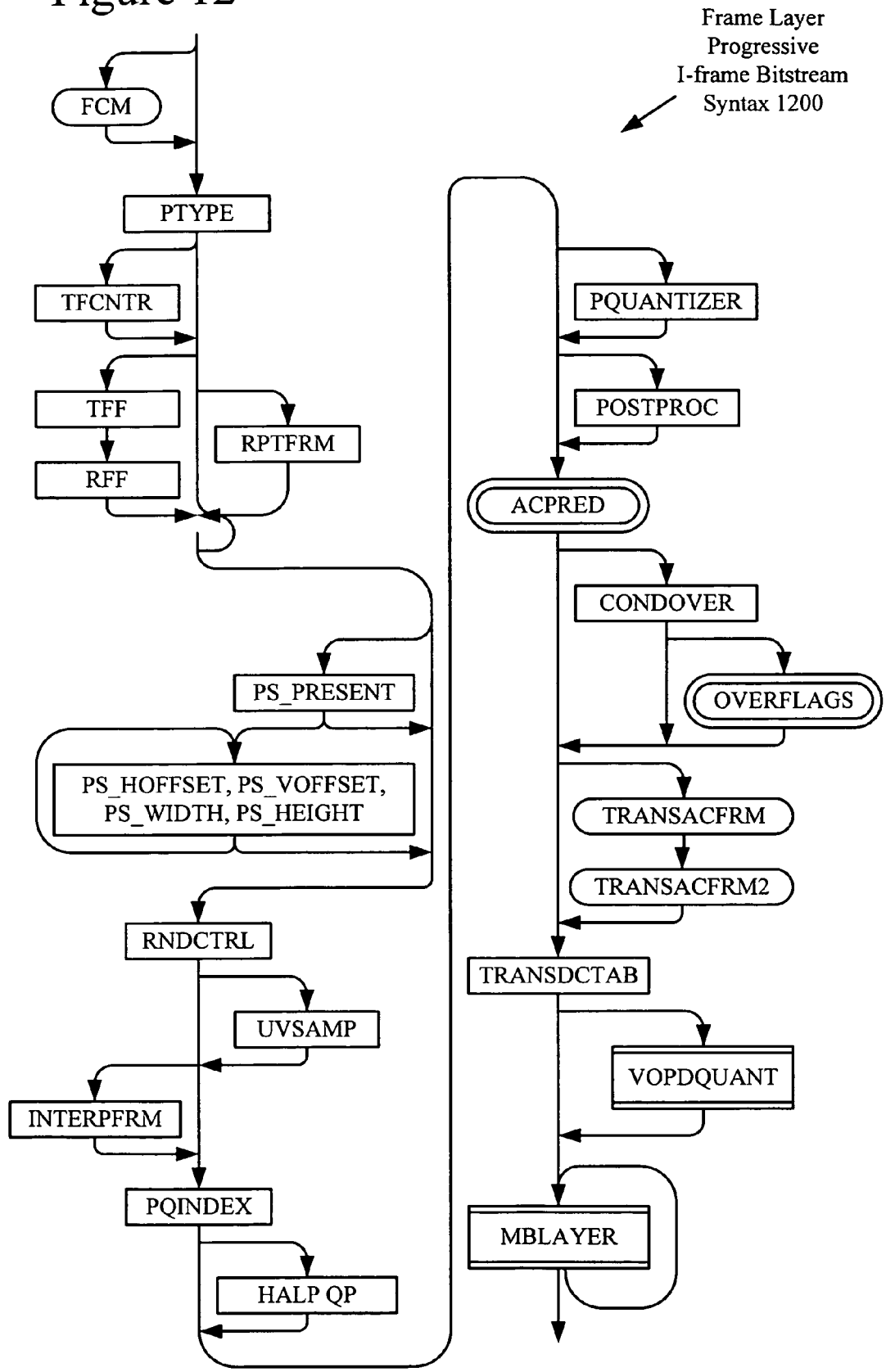
FIG. 12 is a diagram showing a frame-layer bitstream syntax for progressive I-frames in a combined implementation.

For progressive I-frames, frame-level bitstream elements are shown in FIG. 12. (Frame-level syntaxes for other kinds of progressive frames, such as progressive P-frames and progressive B-frames, have different bitstream elements.) Data for each frame consists of a frame header followed by data for the macroblock layer (whether for intra or various inter type macroblocks).

Figure 13:
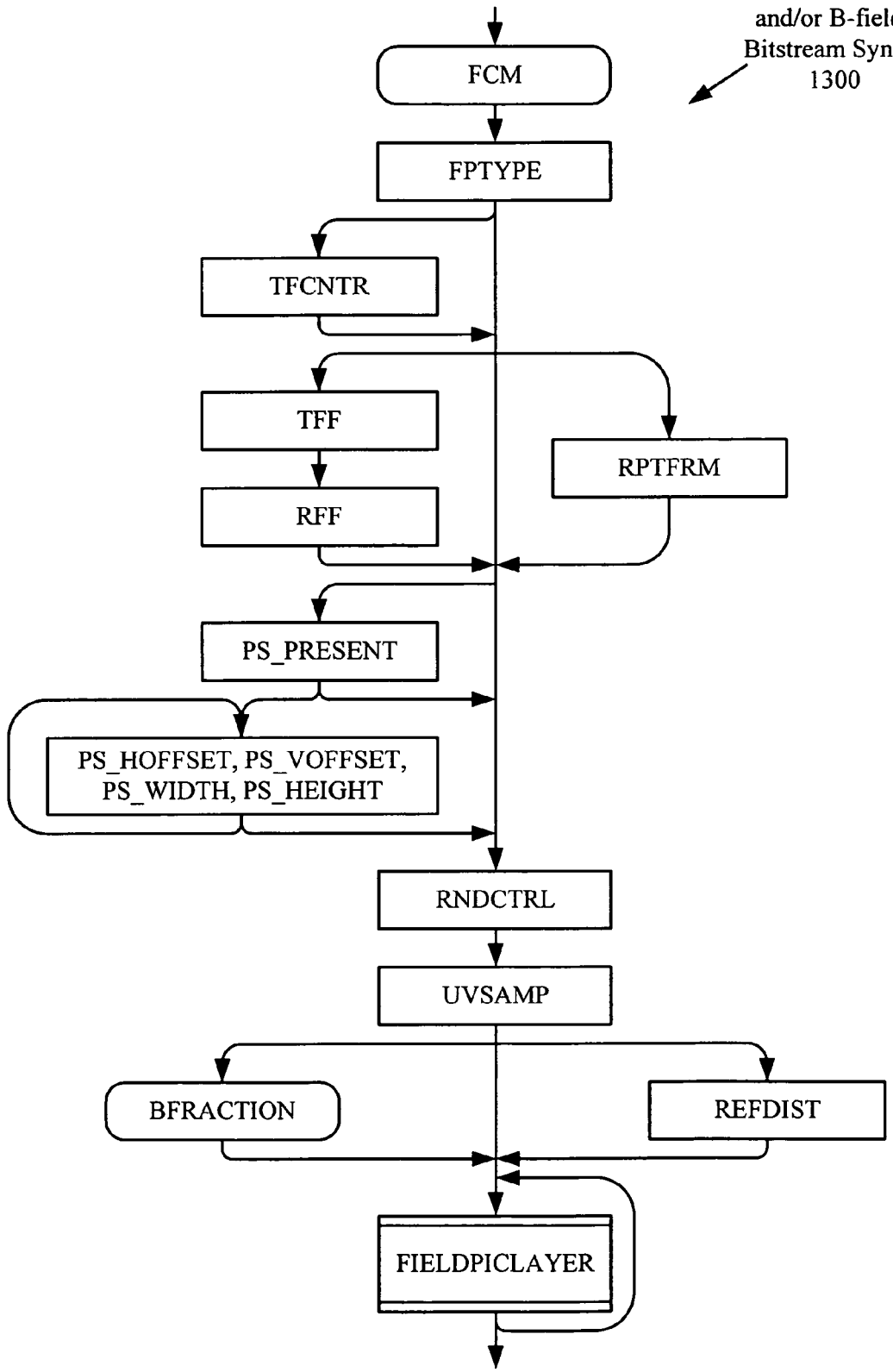
FIG. 13 is a diagram showing a frame-layer bitstream syntax for interlaced I-fields, BI-fields, P-fields or B-fields in a combined implementation.

For interlaced video frames with interlaced I-fields, P-fields, B-fields and/or BI-fields (or potentially other kinds of interlaced fields), frame-level bitstream elements are shown in FIG. 13. Data for each frame consists of a frame header followed by data for the field layers (shown as the repeated "FieldPicLayer" element per field) and data for the macroblock layers.

Figure 14:
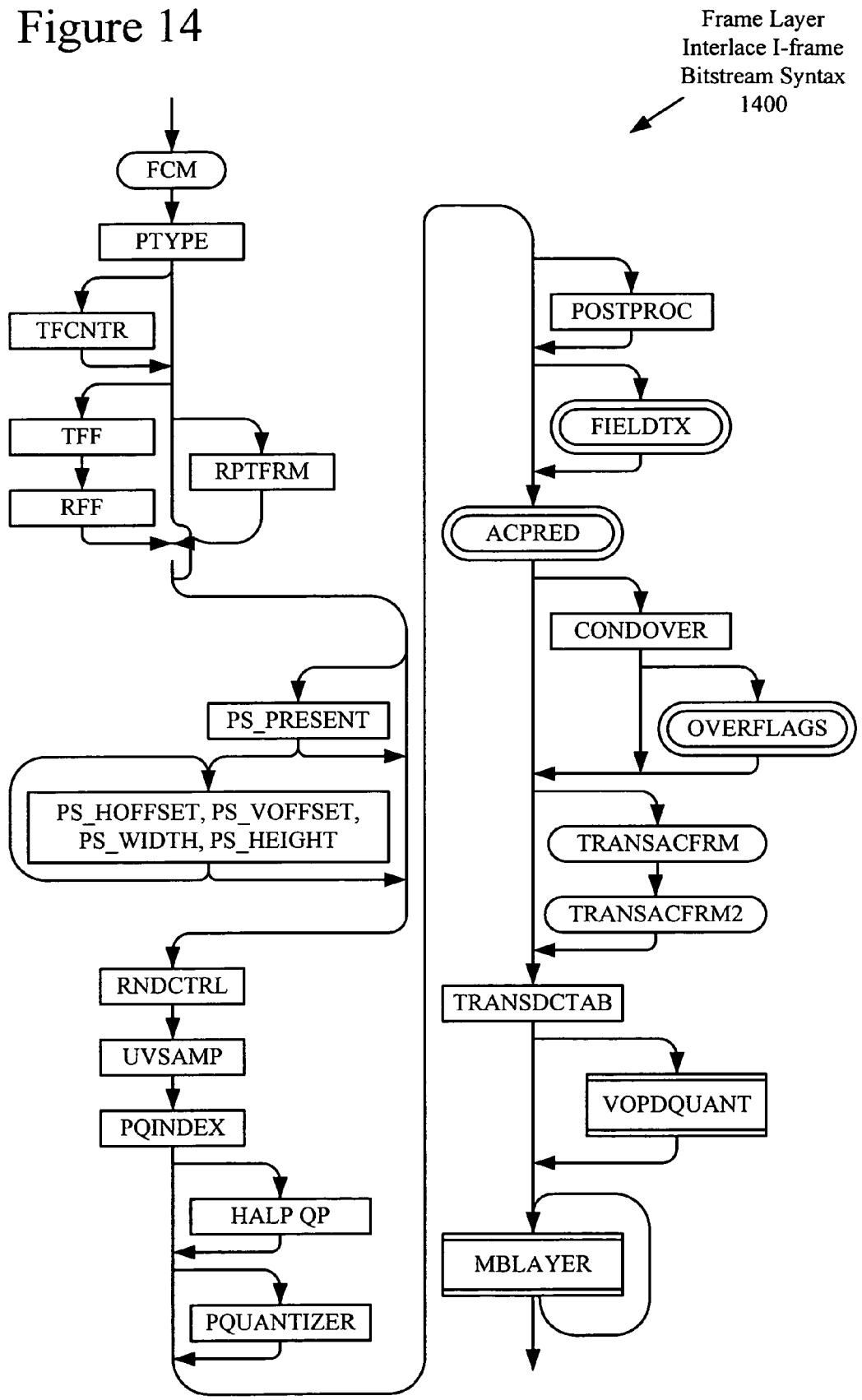
FIG. 14 is a diagram showing a frame-layer bitstream syntax for interlaced I-frames in a combined implementation.

For interlaced I-frames, frame-level bitstream elements are shown in FIG. 14. (Frame-level syntaxes for other kinds of interlaced frames, such as interlaced P-frames and interlaced B-frames, have different bitstream elements.) Data for each frame consists of a frame header followed by data for the macroblock layer (whether for intra or various inter type macroblocks).

B. Selected Bitstream Elements

The following are selected bitstream elements in the sequence and frame layers that are related to signaling for interlaced and progressive pictures. Although the selected bitstream elements are described in the context of a particular layer, the bitstream elements can be used in more than one layer.

Interlace Content (INTERLACE) (1 bit) (Sequence-Level)

INTERLACE is a 1-bit syntax element. INTERLACE=0 signals that the source content is progressive. INTERLACE=1 signals that the source content is interlaced. The individual frames may still be coded using the progressive or interlace syntax when INTERLACE=1. INTERLACE is discussed in further detail below.

Frame Coding Mode (FCM) (Variable Size) (Frame-Level)

FCM is a variable length codeword ["VLC"] used to indicate the picture coding type. FCM takes on values for frame coding modes as shown in Table 1 below:

TABLE 1

| Frame Coding Mode VLC | |
|---|---|
| FCM value | Frame Coding Mode |
| 0 | Progressive |
| 10 | Frame-Interlace |
| 11 | Field-Interlace |

Field Picture Type (FPTYPE) (3 Bits) (Frame-Level)

FPTYPE is three-bit syntax element present in the frame header for a frame including interlaced P-fields, interlaced I-fields, interlaced B-fields, and/or inter laced BI-fields, and potentially other kinds of fields. FPTYPE takes on values for different combinations of field types in the interlaced video frame, according to Table 2 below.

TABLE 2

Field Picture Type FLC

| FPTYPE FLC | First Field Type | Second Field Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

Picture type information also can be signaled at the beginning of the field level for a field, instead of at the frame level for the interlaced video frame including the field.

Picture Type (PTYPE) (Variable Size) (Frame-Level)

PTYPE is a variable size syntax element present in the frame header for progressive and interlaced frames. PTYPE takes on values for different frame types according to Table 3 below.

TABLE 3

Picture Type VLC

| PTYPE VLC | Picture Type |
|---|---|
| 110 | I |
| 0 | P |
| 10 | B |
| 1110 | BI |
| 1111 | Skipped |

If PTYPE indicates that the frame is skipped then the frame is treated as a P-frame that is identical to its reference frame. The reconstruction of the skipped frame is equivalent conceptually to copying the reference frame. A skipped frame means that no further image data is transmitted for this frame, although additional data may be sent relating to display of the frame.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising:
receiving a source interlaced video frame;
for each of plural blocks in the source interlaced video frame:
measuring vertical intensity level fluctuation between neighboring lines in the block;
measuring vertical intensity level fluctuation between alternating lines in the block; and
determining an interlace effect status value for the block based at least in part on the vertical intensity level fluctuation of the neighboring lines and the vertical intensity level fluctuation of the alternating lines;
with a computing device that implements a video encoder, determining a frame-level interlace coding mode for the source interlaced video frame, wherein the determining is based at least in part on the interlace effect status values of the plural blocks; and
outputting, from the computing device that implements the video encoder, encoded data for the source interlaced video frame.

2. The method of claim 1 wherein the plural blocks are 8×16 blocks.

3. The method of claim 1 wherein the frame-level interlace coding mode is frame mode.

4. The method of claim 3 further comprising adaptively selecting field or frame mode for macroblocks of the interlaced video frame.

5. The method of claim 1 wherein the frame-level interlace coding mode is field mode.

6. The method of claim 1 wherein the determining the interlace effect status value comprises calculating a ratio between the vertical intensity level fluctuation of the neighboring lines and the vertical intensity level fluctuation of the alternating lines and comparing the ratio with one or more thresholds.

7. The method of claim 1 wherein the determining the interlace effect status value further comprises measuring horizontal intensity level fluctuation in the block.

8. The method of claim 7 wherein the determining the interlace effect status value further comprises comparing the vertical intensity fluctuation of the neighboring lines with the horizontal intensity level fluctuation.

9. The method of claim 1 wherein the measuring vertical intensity level fluctuation between neighboring lines in the block comprises calculating a maximum of:
an absolute value of a difference in intensity values of:
a first sample at a first sample position in a first line; and
a second sample at a corresponding sample position in a second line that is an immediate neighbor of the first line; and
an absolute value of a difference in intensity values of:
the second sample; and
a third sample at a corresponding sample position in a third line that is an immediate neighbor of the second line.

10. The method of claim 1 wherein the measuring vertical intensity level fluctuation between alternating lines in the block comprises calculating an absolute value of a difference in intensity values of:
a first sample at a first sample position in a first line; and
a second sample at a corresponding sample position in a second line that is separated from the first line by exactly one intervening line.

11. The method of claim 10 wherein the intervening line is in a field of opposite parity relative to the first line and the second line.

12. A non-transitory computer-readable storage medium having stored thereon computer-executable instructions for performing the method of claim 1 with the computing device that implements the video encoder.

13. A method comprising:
with a computing device that implements a video encoder, representing a frame-level interlace coding mode decision with a bitstream element at a layer in a bitstream, wherein the encoding decision comprises:

for each of plural blocks in an interlaced video frame:
  measuring vertical intensity level fluctuation between neighboring lines in the block;
  measuring vertical intensity level fluctuation between alternating lines in the block; and
  determining an interlace effect status value for the block based at least in part on the vertical intensity level fluctuation of the neighboring lines and the vertical intensity level fluctuation of the alternating lines; and
determining the frame-level interlace coding mode for the interlaced video frame based at least in part on the interlace effect status values of the plural blocks.

14. The method of claim 13 wherein the layer in the bitstream is frame layer.

15. The method of claim 13 wherein the bitstream element is a variable length code.

16. The method of claim 13 further comprising:
processing the bitstream element at a video decoder; and
performing one or more video decoding functions based at least in part on the value of the bitstream element.

17. A non-transitory computer-readable storage medium having stored thereon computer-executable instructions for performing the method of claim 13.

18. A computing device that implements a video encoder, the computing device comprising a processor, memory and one or more storage media having stored thereon computer-executable instructions for causing the computing device to perform a method comprising:

receiving a source interlaced video frame;
for each of plural blocks in the source interlaced video frame:
  measuring vertical intensity level fluctuation between neighboring lines in the block;
  measuring vertical intensity level fluctuation between alternating lines in the block; and
  determining an interlace effect status value for the block based at least in part on the vertical intensity level fluctuation of the neighboring lines and the vertical intensity level fluctuation of the alternating lines;
determining a frame-level interlace coding mode for the source interlaced video frame, wherein the determining is based at least in part on the interlace effect status values of the plural blocks; and
outputting encoded data for the source interlaced video frame.

19. The computing device of claim 18 wherein the frame-level interlace coding mode is frame mode, and wherein the method further comprises adaptively selecting field or frame mode for macroblocks of the interlaced video frame.

20. The computing device of claim 18 wherein the determining the interlace effect status value comprises calculating a ratio between the vertical intensity level fluctuation of the neighboring lines and the vertical intensity level fluctuation of the alternating lines and comparing the ratio with one or more thresholds.

* * * * *

UNITED STATES PATENT AND TRADEMARK OFFICE
CERTIFICATE OF CORRECTION

| | | |
|---|---|---|
| PATENT NO. | : 7,889,789 B2 | |
| APPLICATION NO. | : 11/400751 | |
| DATED | : February 15, 2011 | |
| INVENTOR(S) | : Minghui Xia et al. | |

It is certified that error appears in the above-identified patent and that said Letters Patent is hereby corrected as shown below:

In column 16, line 62, after "is" insert -- a --.

Signed and Sealed this
Twenty-sixth Day of July, 2011

David J. Kappos
*Director of the United States Patent and Trademark Office*